United States Patent
Kwon et al.

(10) Patent No.: US 10,453,274 B2
(45) Date of Patent: Oct. 22, 2019

(54) TEXTURE COMPRESSING METHOD AND APPARATUS AND TEXTURE DECOMPRESSING METHOD AND APPARATUS

(71) Applicant: Samsung Electronics Co., Ltd., Suwon-si, Gyeonggi-do (KR)

(72) Inventors: Sun-min Kwon, Seoul (KR); Ho-young Kim, Seoul (KR); Hee-jun Shim, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 86 days.

(21) Appl. No.: 15/689,306

(22) Filed: Aug. 29, 2017

(65) Prior Publication Data

US 2018/0130263 A1    May 10, 2018

(30) Foreign Application Priority Data

Nov. 4, 2016  (KR) .......................... 10-2016-0146948

(51) Int. Cl.
*G06T 19/20* (2011.01)
*G06T 9/00* (2006.01)
(Continued)

(52) U.S. Cl.
CPC ............ *G06T 19/20* (2013.01); *G06F 3/1454* (2013.01); *G06T 9/00* (2013.01); *G06T 11/001* (2013.01);
(Continued)

(58) Field of Classification Search
CPC ... G06T 19/20; G06T 11/001; G06T 2210/32; G06T 2219/2012; G06T 9/00;
(Continued)

(56) References Cited

U.S. PATENT DOCUMENTS 6,836,564 B2    12/2004   Katayama et al.
7,366,357 B2     4/2008   Curry et al.
(Continued)

FOREIGN PATENT DOCUMENTS

EP    2380353 B1    10/2011
JP    2002142119 A   5/2002
(Continued)

OTHER PUBLICATIONS

Extended European Search Report dated Mar. 26, 2018 for corresponding European Application No. 17198967.6.

*Primary Examiner* — Xilin Guo
(74) *Attorney, Agent, or Firm* — Harness, Dickey & Pierce, P.L.C.

(57) ABSTRACT

Provided are a texture compressing method and a texture compressing apparatus, which compress some color information of a texture block, which is unable to realize all colors included in the texture block by a determined compression bit number, to be stored in a compression data bit of a texture block, which is able to realize all colors included in the texture block by a bit number lower than the determined compression bit number, based on a color distribution of each texture block, and a texture decompressing method and a texture decompressing apparatus corresponding to the texture compressing method and the texture compressing apparatus.

20 Claims, 15 Drawing Sheets

(51) Int. Cl.
 *G06F 3/14* (2006.01)
 *G06T 11/00* (2006.01)
 *H04N 1/64* (2006.01)
 *G06F 9/455* (2018.01)

(52) U.S. Cl.
 CPC ............ *H04N 1/644* (2013.01); *G06F 9/455* (2013.01); *G06F 2009/4557* (2013.01); *G06T 2210/32* (2013.01); *G06T 2219/2012* (2013.01); *G09G 2340/02* (2013.01)

(58) Field of Classification Search
 CPC ......... G06T 11/00; G06T 15/04; G06T 17/00; G06T 15/405; G06T 15/00; G06T 1/20; G06T 15/005; G06T 2200/28; H04N 1/644; H04N 1/64; G06F 3/1454; G06F 9/455; G06F 2009/4557; G06F 3/14; G09G 2340/02
 See application file for complete search history.

(56) References Cited

U.S. PATENT DOCUMENTS

| 8,577,164 | B2 | 11/2013 | Strom et al. | |
|---|---|---|---|---|
| 2004/0151372 | A1* | 8/2004 | Reshetov | G06T 9/005 |
| | | | | 382/166 |
| 2013/0084018 | A1* | 4/2013 | Nystad | G06K 9/36 |
| | | | | 382/232 |
| 2013/0286034 | A1 | 10/2013 | Diard | |
| 2014/0327668 | A1 | 11/2014 | Strom et al. | |

FOREIGN PATENT DOCUMENTS

| JP | 2005229622 A | 8/2005 |
|---|---|---|
| WO | WO-2010/082886 A1 | 7/2010 |

\* cited by examiner

FIG. 5

```
Block size : 4 x 4
# of total compress data bits : 64 bits
# of supporting -bit mode: m bits
# of Endpoint Color and config bits : n bits
# of Index (or Weight) bits : l bits
```

FIG. 8

| BIT SUPPORTING MODE (2 BITS) | DESCRIPTION |
|---|---|
| 00 | WHEN SUPPORTING BIT IN LEFT OR RIGHT TEXTURE BLOCK IS NOT '00', USE SUPPORTING BIT DATA AS ADDITIONAL ENDPOINT AND INDEX |
| 01 | SHARE SUPPORTING BIT TO RIGHT |
| 10 | SHARE SUPPORTING BIT TO LEFT |
| 11 | SHARE SUPPORTING BIT TO RIGHT AND LEFT |

FIG. 12

| BIT SUPPORTING MODE (3 BITS) | DESCRIPTION |
|---|---|
| 000 | WHEN SUPPORTING BIT IN UPPER, LOWER, LEFT, AND RIGHT TEXTURE BLOCK IS NOT '000', USE SUPPORT BIT DATA AS ADDITIONAL ENDPOINT AND INDEX |
| 001 | SHARE SUPPORT BIT TO RIGHT |
| 010 | SHARE SUPPORT BIT TO LEFT |
| 011 | SHARE SUPPORT BIT TO RIGHT AND LEFT |
| 100 | SHARE SUPPORT BIT TO TOP, BOTTOM, LEFT, AND RIGHT |
| 101 | SHARE SUPPORT BIT TO TOP |
| 110 | SHARE SUPPORT BIT TO BOTTOM |
| 111 | SHARE SUPPORT BIT TO BOTTOM AND TOP |

TEXTURE COMPRESSING METHOD AND APPARATUS AND TEXTURE DECOMPRESSING METHOD AND APPARATUS

CROSS-REFERENCE TO RELATED APPLICATION

This U.S. non-provisional application claims the benefit of priority under 35 U.S.C. § 119 to Korean Patent Application No. 10-2016-0146948, filed on Nov. 4, 2016, in the Korean Intellectual Property Office, the disclosure of which is incorporated herein in its entirety by reference.

BACKGROUND

1. Field

Various example embodiments relate to a texture compressing method, system, apparatus, and/or non-transitory computer readable medium. Additionally, various example embodiments also relate to a texture decompressing method, system, apparatus, and/or non-transitory computer readable medium corresponding to the texture compressing method and apparatus.

2. Description of the Related Art

A plurality of texture blocks used in image processing may form one texture and may each be compressed by the same bit number. When a size of the texture block is 4×4, one texture block includes 16 texels total. In this case, despite one texture block having one to sixteen colors, since all texture blocks are compressed by the same bit number, some texture blocks may have an excessive or insufficient bit number for compressing the color information regarding all of the colors included in the original uncompressed texture blocks. As a result, the some texture blocks may have compressed an unnecessary color or may be unable to realize all colors included in the original uncompressed texture blocks.

SUMMARY

Provided are a texture compressing method, system, apparatus, and/or non-transitory computer readable medium whereby some color information of a texture block, which is unable to realize all colors included in the texture block by a determined compression bit number, is compressed to be stored in a compression data bit of a texture block, which is able to realize all colors included in the texture block by a bit number lower than the determined compression bit number, based on a color distribution of each texture block, and a texture decompressing method and apparatus corresponding to the texture compressing method and apparatus.

Additional aspects will be set forth in part in the description which follows and, in part, will be apparent from the description, or may be learned by practice of at least one example embodiment.

According to an aspect of at least one example embodiment, a texture compressing method includes: analyzing, using at least one processor, a supporting relationship between a plurality of adjacent texture blocks of a plurality of texture blocks based on a color distribution of the plurality of texture blocks forming a texture; determining, using the at least one processor, a bit supporting mode indicating the supporting relationship between the plurality of adjacent texture blocks, and information about at least one color assigned to each of the plurality of texture blocks; compressing, using the at least one processor, at least one texture block of the plurality of texture blocks based on the determined bit supporting mode and the determined information as first and second compression parameters; and outputting, using the at least one processor, the at least one compressed texture block to a memory.

According to an aspect of at least one example embodiment, a non-transitory computer-readable recording medium has recorded there on on computer readable instructions which, when executed by at least one processor, performs the texture compressing method.

According to an aspect of at least one example embodiment, a texture compressing apparatus includes: a memory configured to store computer-executable instructions; and at least one processor configured to execute the computer-executable instruction to: analyze a supporting relationship between a plurality of adjacent texture blocks of a plurality of texture blocks based on a color distribution of the plurality of texture blocks forming a texture; determine a bit supporting mode indicating the supporting relationship between the plurality of adjacent texture blocks, and information about at least one color assigned to each of the plurality of texture blocks; compress at least one texture block of the plurality of texture blocks based on the determined bit supporting mode and the determined information as first and second compression parameters, and output the at least one compressed texture block to a memory.

According to an aspect of at least one example embodiment, a texture decompressing method includes: obtaining, using at least one processor, a bit supporting mode indicating a supporting relationship between a plurality of adjacent texture blocks, and information about a color assigned to an original texture block from a compressed texture block, wherein the bit supporting mode and the information are first and second compression parameters; determining, using the at least one processor, whether to use information about a color assigned to the plurality of adjacent texture blocks based on the bit supporting mode; and generating, using the at least one processor, texels forming the original texture block based on the information about the color assigned to each texture block of the plurality of adjacent texture blocks, according to a result of the determining.

According to an aspect of at least one example embodiment, a non-transitory computer-readable recording medium has recorded there on computer readable instructions which, when executed by at least one processor, performs the texture decompressing method.

According to an aspect of at least one example embodiment, a texture decompressing apparatus includes: a memory configured to store computer-executable instructions; at least one processor configured to execute the computer-executable instructions to: obtain a bit supporting mode indicating a supporting relationship between a plurality of adjacent texture blocks, and information about a color assigned to an original texture block from a compressed texture block, wherein the bit supporting mode and the information are first and second compression parameters; determine whether to use information about at least one color assigned to each of the plurality of adjacent texture blocks based on the bit supporting mode; and generate texels forming the original texture block based on the information about the at least one color assigned to each texture block of the plurality of adjacent texture blocks, according to a result of the determining.

According to an aspect of at least one example embodiment, a texture compressing method using a graphics processing unit includes: calculating, using at least one processor, a number of colors included in a first texture block, determining, using the at least one processor, a supporting relationship between the first texture block and at least one adjacent texture block based on results of the calculating, setting, using the at least one processor, a bit supporting mode based on results of the determining, compressing, using the at least one processor, the first texture block based on the determined bit supporting mode, and outputting, using the at least one processor, the compressed first texture block to a memory.

BRIEF DESCRIPTION OF THE DRAWINGS

The foregoing and other features of inventive concepts will be apparent from the more particular description of non-limiting example embodiments of inventive concepts, as illustrated in the accompanying drawings in which like reference characters refer to like parts throughout the different views. The drawings are not necessarily to scale, emphasis instead being placed upon illustrating principles of inventive concepts. In the drawings:

FIG. 5 is a diagram for describing a compression data format of a compressed texture block including information about a bit supporting mode indicating a supporting relationship between texture blocks according to at least one example embodiment;

FIG. 8 is a diagram for describing an example of a bit supporting mode indicating a supporting relationship between texture blocks according to at least one example embodiment;

FIG. 12 is a diagram for describing another example of a bit supporting mode indicating a supporting relationship between texture blocks according to at least one example embodiment;

DETAILED DESCRIPTION

Figure 1:
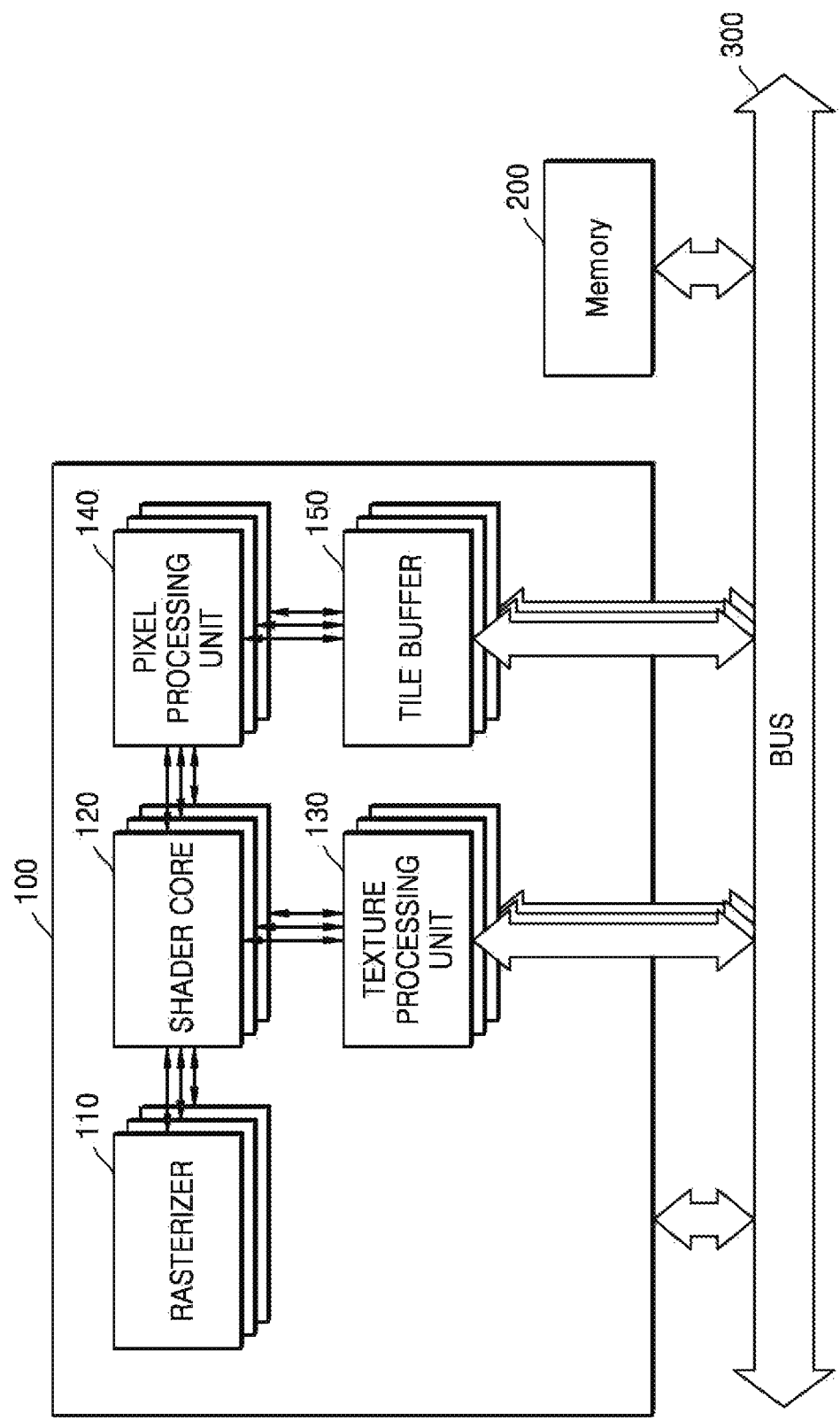
FIG. 1 is a diagram of a graphics processing apparatus according to at least one example embodiment.

Reference will now be made in detail to various example embodiments, examples of which are illustrated in the accompanying drawings, wherein like reference numerals refer to like elements throughout. In this regard, the example embodiments may have different forms and should not be construed as being limited to the descriptions set forth herein. Accordingly, the example embodiments are merely described below, by referring to the figures, to explain aspects.

It will be further understood that the terms "comprises" or "comprising" used herein specify the presence of stated features or components, but do not preclude the presence or addition of one or more other features or components.

It will be understood that although the terms "first", "second", etc. may be used herein to describe various components, these components should not be limited by these terms. These components are only used to distinguish one component from another.

One or more example embodiments described hereinafter are related to a texture compressing method, system, apparatus, and/or non-transitory computer readable medium, and a texture decompressing method, system, apparatus, and/or non-transitory computer readable medium which correspond to the texture compressing method, system, apparatus, and/or non-transitory computer readable medium and details well-known to one of ordinary skill in the art may not be provided.

FIG. 1 is a diagram of a graphics processing apparatus 100 according to at least one example embodiment. It would be obvious to one of ordinary skill in the art that the graphics processing apparatus 100 may include general-purpose components other than those shown in FIG. 1.

Referring to FIG. 1, the graphics processing apparatus 100 may include a rasterizer 110, a shader core 120, a texture processing unit 130, a pixel processing unit 140, and a tile buffer 150, etc., but is not limited thereto. The graphics processing apparatus 100 may exchange data with an external memory 200 through a bus 300.

The graphics processing apparatus 100 shown in FIG. 1 is an apparatus for processing 3-dimensional (3D) graphics, and may use a tile-based rendering (TBR) method. In other words, in order to generate 3D graphics corresponding to one frame (e.g., a single frame), the graphics processing apparatus 100 may process a plurality of tiles forming the frame, where the plurality of tiles have a uniform size, through a graphics pipeline, such as a graphics pipeline including the rasterizer 110, the shader core 120, and the pixel processing unit 140, etc., and the graphics processing apparatus 100 may store a process result in the tile buffer 150. According to some example embodiments, the graphics processing apparatus 100 may parallel-process all of the tiles forming a frame by using a plurality of channels each including a graphics pipeline and each of the graphics pipeline including a rasterizer 110, a shader core 120, and a pixel processing unit 140, etc. When the plurality of tiles corresponding to the one frame are processed, the graphics processing apparatus 100 may transmit the process result stored in the tile buffer 150 to a frame buffer (not shown) of the memory 200.

According to some example embodiments, the shader core 120 may include a pixel shader. The shader core 120 may further include a vertex shader or include an integrated shader in which the vertex shader and the pixel shader are integrated. When the shader core 120 performs a function of the vertex shader, the shader core 120 may generate a primitive indicating an object included in the tile and transmit the primitive to the rasterizer 110.

The rasterizer 110 may perform rasterization on the primitive generated by the vertex shader through a geometric transformation process.

The shader core 120 may perform pixel shading by receiving the rasterized primitive from the rasterizer 110. The shader core 120 may perform pixel shading by determining the colors of every pixel forming a tile, with respect to tiles including fragments of the primitive generated through rasterization. The shader core 120 may use a pixel value generated by using a texture, so as to generate realistic 3D graphics during the pixel shading.

When the shader core 120 requests the texture processing unit 130 to transmit a pixel value corresponding to a desired pixel, the texture processing unit 130 may transmit a pixel value generated by processing a desired and/or pre-prepared texture. A texture may be stored in a certain space inside or outside the texture processing unit 130 or in the memory 200 outside the graphics processing apparatus 100. When a texture used to generate a pixel value requested by the shader core 120 is not stored in the desired and/or certain space inside the texture processing unit 130, the texture processing unit 130 may obtain the texture from the desired and/or certain space or the memory 200 outside the texture processing unit 130.

The pixel processing unit 140 may determine all pixel values corresponding to one tile by determining a pixel value to be finally displayed, through processes, such as a depth test, etc., with respect to pixels corresponding to the same location in one tile.

The tile buffer 150 may store some or all of the pixel values corresponding to one tile, which are received from the pixel processing unit 140. When a graphics processing operation is performed on some or all of the tiles forming one frame, the process result stored in the tile buffer 150 may be transmitted to the frame buffer of the memory 200.

Figure 2:
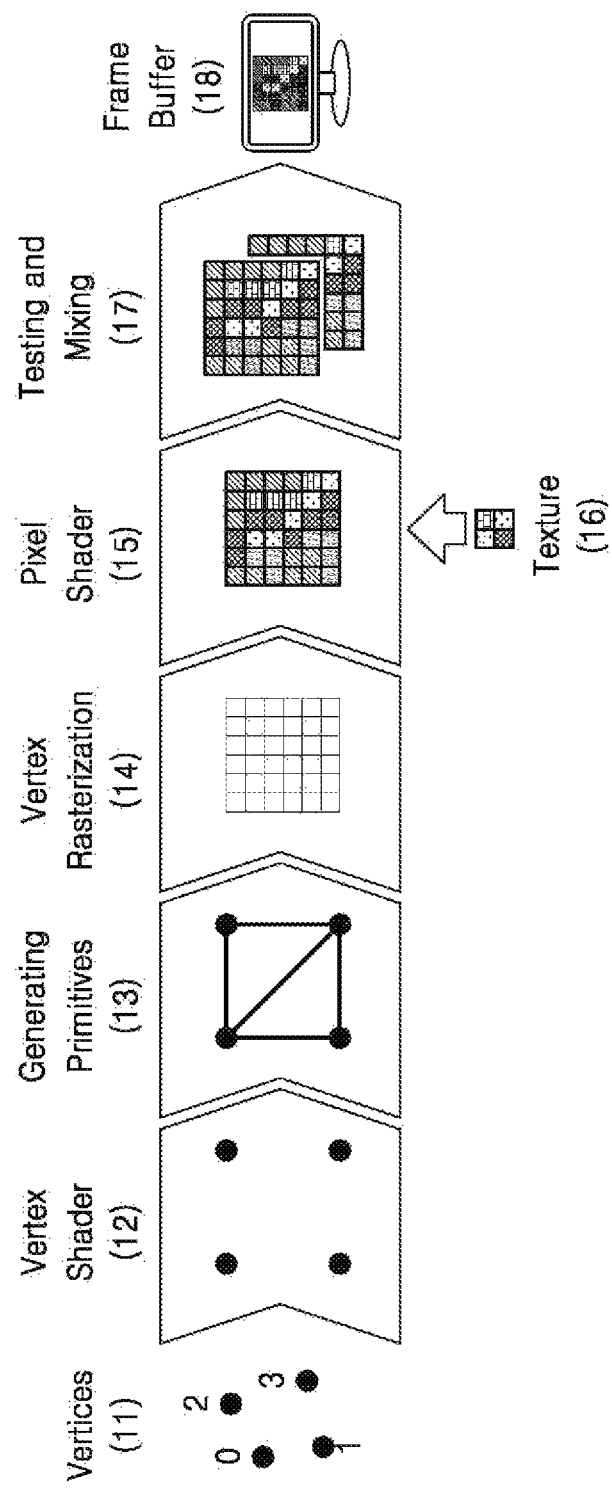
FIG. 2 is a diagram for describing processes of processing 3-dimensional (3D) graphics by a graphics processing apparatus according to at least one example embodiment.

FIG. 2 is a diagram for describing processes of processing 3D graphics by the graphics processing apparatus 100 according to at least one example embodiment.

The processes of processing 3D graphics may be largely divided into three operations, geometric transformation, rasterization, and pixel shading, and details thereof will now be described with reference to FIG. 2. Referring to FIG. 2, the processes of processing 3D graphics may be performed through operations 11 through 18.

In operation 11, vertices associated with an image are generated. The vertices are generated to indicate objects included in the 3D graphics of the image.

In operation 12, the generated vertices are shaded. A vertex shader may perform shading on the vertices by assigning locations (e.g., 3D locations or 3D coordinates) to the vertices generated in operation 11.

In operation 13, primitives are generated based on the generated vertices. A primitive may be a point, a line, or a polygon formed by using at least one vertex of the plurality of vertices. For example, a primitive may be a triangle formed by connecting at least three vertices.

In operation 14, the primitives are rasterized. Rasterization of a primitive may mean that the primitive is divided into fragments. A fragment may be a basic unit for performing a graphics process on a primitive. Since a primitive includes only information about a vertex, fragments between vertices are generated during rasterization so as to perform a graphics process on 3D graphics.

In operation 15, at least one pixel is shaded based on the results of the rasterization (e.g., the generated fragments). The fragments forming the primitive, which are generated by the rasterization, may include one or more pixels forming a tile. In the related fields, the term "fragment" may be used interchangeably with the term pixel in some cases. For example, a pixel shader may be referred to as a fragment shader. Generally, a basic unit of a graphics process, which form a primitive, may be referred to as a fragment, and then the basic unit of graphics process may be referred to as a pixel during pixel shading. During the pixel shading a color associated with the pixel may be determined.

In operation 16, texturing is performed to determine the color of the pixel. The texturing is a process of determining the color of the pixel by using a desired and/or pre-prepared image, i.e., a texture. Since a data throughput required for a graphics process and a graphics processing time are largely increased when the color of each pixel is calculated and determined so as to express various colors and patterns of the real world, the color of a pixel is determined by using a desired and/or pre-prepared texture. For example, a surface color of an object may be stored as a separate 2D image of a texture, and a color of a pixel may be determined by enlarging or reducing the stored texture according to a location and size of the object on a screen, or by mixing texel values by using textures having various resolutions.

For example, in order to process 3D graphics faster during pixel shading, a pixel value generated by using a desired and/or pre-prepared texture may be used. According to at least one example embodiment, in order to adaptively deal with the size of a 3D object, a plurality of textures having different resolutions may be pre-prepared and combined to generate the pixel value. The desired and/or pre-prepared textures having different resolutions are referred to as a mipmap. For example, in order to generate pixel values of an object having an intermediate resolution of two pre-prepared mipmaps, texel values at locations corresponding to the object may be extracted from the two mipmaps and filtered, thereby generating the pixel values forming the object.

In operation 17, testing and mixing are performed. Pixel values corresponding to one tile may be determined by determining a pixel value to be finally displayed, through processes, such as a depth test, with respect to pixels corresponding to the same locations in the tile. A plurality of tiles generated as such may be mixed to generate 3D graphics corresponding to one frame.

In operation 18, the frame generated through operations 11 through 17 is stored in a frame buffer, and the frame stored in the frame buffer is displayed on a display device, Referring back to FIG. 1, the memory 200 may store at least one compressed texture or may store, in the frame buffer of the memory 200, at least one frame generated by the graphics processing apparatus 100. The memory 200 may store at least one frame generated as a rendering result of the graphics processing apparatus 100 in the frame buffer of the memory 200. The memory 200 may transmit at least one texture to the texture processing unit 130 according to a request of the texture processing unit 130.

Meanwhile, it is physically impossible to store all of the textures of various objects and mipmaps respectively corresponding to the textures in a certain space in the texture processing unit 130, or in other words, the texture processing unit 130 may not include enough storage space and/or memory space to store all of the textures and/or mipmaps associated with the objects to be displayed. In order to reduce the amount of storage space required to store a texture and efficiently transmit the texture, the texture is generally compressed to be stored and/or transmitted by 3D graphics rendering. One texture may be divided into a plurality of texture blocks having the same size, and the texture blocks may be compressed by the same number of bits (e.g., bit numbers). Hereinafter, a compressing process and a decompressing process of a texture block having a size of 4×4 will be described, however the example embodiments are not limited thereto and the texture block may have any size.

Figure 3:
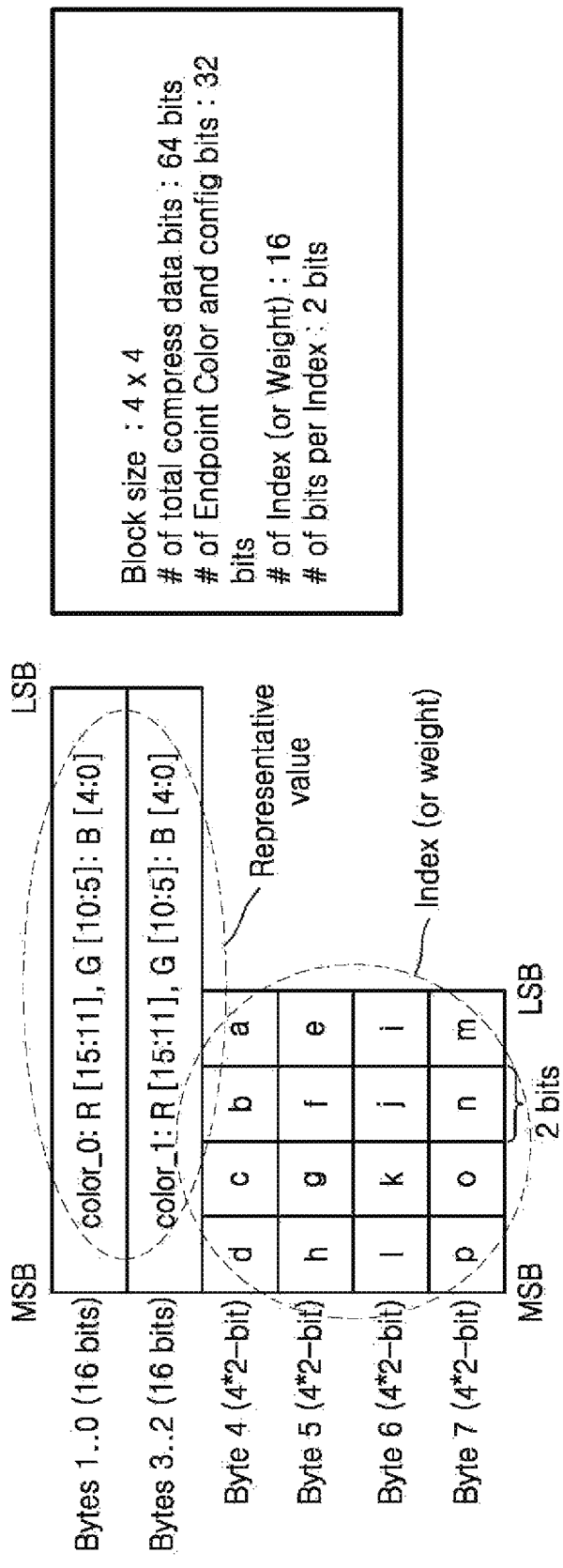
FIG. 3 is a diagram for describing compressing of a texture block and a compression data format of a compressed texture block according to at least one example embodiment.

FIG. 3 is a diagram for describing compressing of a texture block and a compression data format of a compressed texture block according to at least one example embodiment.

Generally, a texture is stored after being compressed during a 3D graphics processing operation so as to satisfy requirements of a hardware resource and communication environment. A general compressing method is performed on texels forming a texture, in a desired and/or predetermined block unit, i.e., a texture block.

Regarding general texture compressing standards, a representative value representing some or all of the texels in a texture block is determined with respect to the texture block to be compressed (e.g., the texture block that is designated and/or selected to be compressed), and an index indicating the representative value selection information or a weight to be applied to the representative value is determined for each texel, so as to store the representative value and the index or the weight as compression data.

For example, when a size of a texture block is 4×4 (e.g., 4 texels×4 texels), one texture block includes 16 texels total. Despite one texture block having, for example, 1 to 16 colors, since all of the texture blocks are compressed by the same number of bits during a compressing process, a color value representing all of the texels included in the texture block may be determined and used as a representative value. For example, when the 16 texels include 4 colors total, 4 color values may each be determined as a representative value, and an index indicating information regarding the selection of one of the 4 color values may be determined per pixel. As another example, a largest value and a smallest value, which correspond to end point values when the color values of 16 texels are arranged in a size order, may be determined as representative values, and a weight to be applied to the two end point values so as to represent each texel value may be determined per texel.

Referring to FIG. 3, a shape of a compressed texture block and a format of compression data with respect to a texture block having a 4×4 size (e.g., 4×4 texel size) are shown. As shown in the example illustrated in FIG. 3, a compressed texture block may store two representative values, and an index or weight of each texel. One texture block is compressed to compression data of 64 bits total (e.g., a total compressed size of 64 bits) by assigning 32 bits to the two representative values and 2 bits to information about the index or weight of each of the 16 texels. However, the compressed texture block of FIG. 3 uses one of the texture compressing standards, and the example embodiments are not limited thereto.

Meanwhile, based on an inverse process of a compressing method (e.g., a decompressing method), a compressed texture block may be decompressed to reconstruct the uncompressed and/or original texture block. However, as described above, since some or all of the texture blocks are compressed using the same number of bits during a compressing process despite different texture blocks forming a texture and having different numbers of color values, some texture blocks may have insufficient or excessive numbers of bits for accurately compressing all of the information regarding the colors included in the original texture blocks. As a result, some texture blocks are unable to perfectly realize all of the colors included in the original texture blocks, and other some texture blocks may have compressed one or more unnecessary colors. Hereinafter, methods of compressing and decompressing some color information of a texture block, which is unable to realize all of the colors included in the texture block using a determined compression bit number (e.g., number of bits used in the compression process), to be stored in a supporting bit of a compression data bit of a texture block, which is able to realize all of the colors included in the texture block by a bit number lower than the determined compression bit number based on a color distribution of each texture block will be described.

Figure 4:
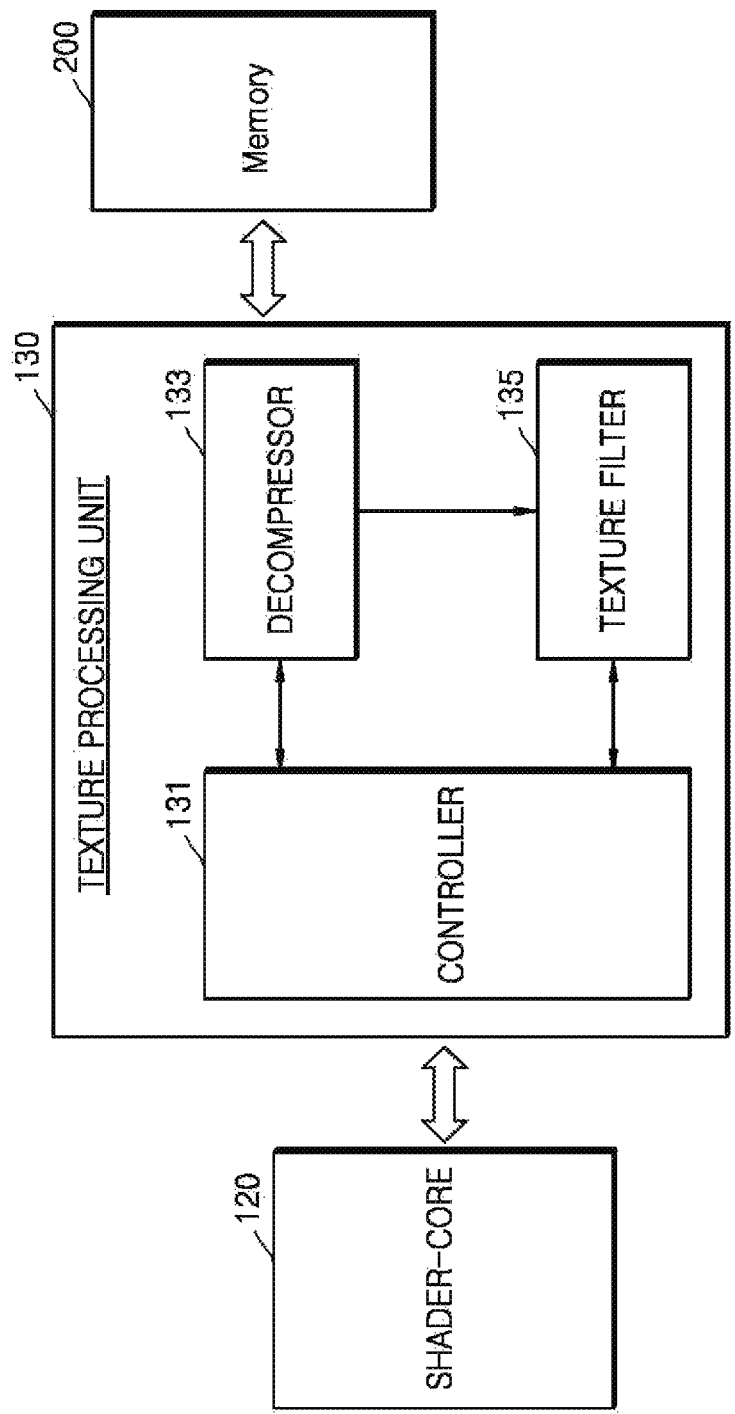
FIG. 4 is a block diagram of a structure of a texture processing unit according to at least one example embodiment.

FIG. 4 is a block diagram of a structure of the texture processing unit 130 according to at least one example embodiment. According to at least one example embodiment, while the decompressor 133 of the texture processing unit 130 in FIG. 4 is illustrated as being a component of the texture processing unit, the example embodiments are not limited thereto and the decompressor 133 may in other example embodiments be a texture decompressing apparatus, wherein the texture decompressing apparatus may be realized as an independent module and/or apparatus outside (e.g., external to) the texture processing unit 130.

Referring to FIG. 4, the texture processing unit 130 may include a controller 131, the decompressor 133, and a texture filter 135, but the example embodiments are not limited thereto and the texture processing unit 130 may include greater or lesser number of constituent elements.

The controller 131 may control some or all of the operations of the texture processing unit 130 by performing operations required to control the texture processing unit 130 and/or controlling the decompressor 133 and the texture filter 135.

The decompressor 133 may perform decompression when the texture processing unit 130 receives a compressed texture from the memory 200, which may be outside the texture processing unit 130. In general texture compressing standards, a texture may be compressed to texture blocks, and thus the decompressor 133 may receive compressed texture blocks and/or compressed textures.

Here, a compressed texture block denotes a texture block in which texels forming a texture are compressed in certain block units. On the other hand, a texture block denotes texels in certain block units, which are to be compressed from among texels forming a texture before being compressed, or texels generated by completely decompressing a compressed texture block. Meanwhile, one texture may include at least one texture block. One compressed texture may include at least one compressed texture block. In other words, a texture may be compressed to at least one compressed texture block.

The decompressor 133 may generate a texture block (e.g., an uncompressed texture block, an original texture block, etc.) by decompressing a compressed texture block. The decompressor 133 may perform a process of extracting compression parameters used during a compression process from the compressed texture block, and then perform a process of generating a texel value from the extracted compression parameters. The decompressor 133 may search for a certain value based on the compression parameters or may obtain the certain value by performing interpolation, so as to generate the texel value.

For example, the decompressor 133 may obtain information about a representative value of texels forming a texture block, an index and/or weight for each of the texels forming the texture block, and a bit supporting mode indicating a supporting relationship between texture blocks, based on the compressed texture block.

The representative value may be determined to be an arbitrary value based on the values of the texels forming the texture block (e.g., the representative value may be located in a desired location in the texels forming the texture block, such as the first bit of the texture block, etc.). For example, the representative value may be a color value having a highest frequency from among color values of the texels forming the texture block, or may have an end point value when the texels are arranged in a certain order.

The index of each texel may be information about selecting of the representative value. For example, when there are two representative values, i.e., a first representative value and a second representative value, the first representative value may be selected as a texel value of a first texel when an index bit value of 1 bit of the first texel is '0', and the second representative value may be selected as the texel value of the first texel when the index bit value of 1 bit is '1'. The weight of each pixel may be a weight value, information regarding encoding the weight value, or an index of the weight. For example, when a weight is assigned to each texel, a texel value of a first texel may be a weighted average value obtained by using a value corresponding to a weight of the first texel and representative values of a texture block.

The representative value and the index or weight obtained based on the compressed texture block may vary according to a type of texture compressing standard. In other words, the number of representative values or a representative value determining method may vary according to the type of texture compressing standard, and accordingly, the index or the weight may be used.

The bit supporting mode indicating the supporting relationship between the texture blocks may be included in the compression data bit of the compressed texture block. A bit number assigned to the bit supporting mode in the compression data bit may be, for example, 2 or 3 bits long, but is not limited thereto.

FIG. 5 is a diagram for describing a compression data format of a compressed texture block including information about a bit supporting mode indicating a supporting relationship between texture blocks according to at least one example embodiment.

According to the compression data format of the compressed texture block of FIG. 5, m bits are assigned to information about the bit supporting mode, n bits are assigned to a representative value, such as an end point color, and l bits are assigned to an index or weight of each texel, wherein m+l+n are 64 bits total.

Referring back to FIG. 4, the decompressor 133 may perform a process of extracting compression parameters used during a compressing process, from the compressed texture block. The decompressor 133 may extract the compression parameters, such as a representative value, an index or weight, and a bit supporting mode indicating a supporting relationship between texture blocks. When the compressed texture block provides a supporting bit for another texture block, a supporting bit may be further extracted as the compression parameter.

According to some example embodiments, the decompressor 133 may store the extracted compression parameters in a texture cache for use with the current compressed texture block and/or future compressed texture blocks.

The decompressor 133 may obtain a color value of each of the texels forming the texture block based on the representative value and the index or weight, The decompressor 133 may perform parallel processing on a plurality of compressed texture blocks so as to obtain a plurality of texel values.

Figure 6:
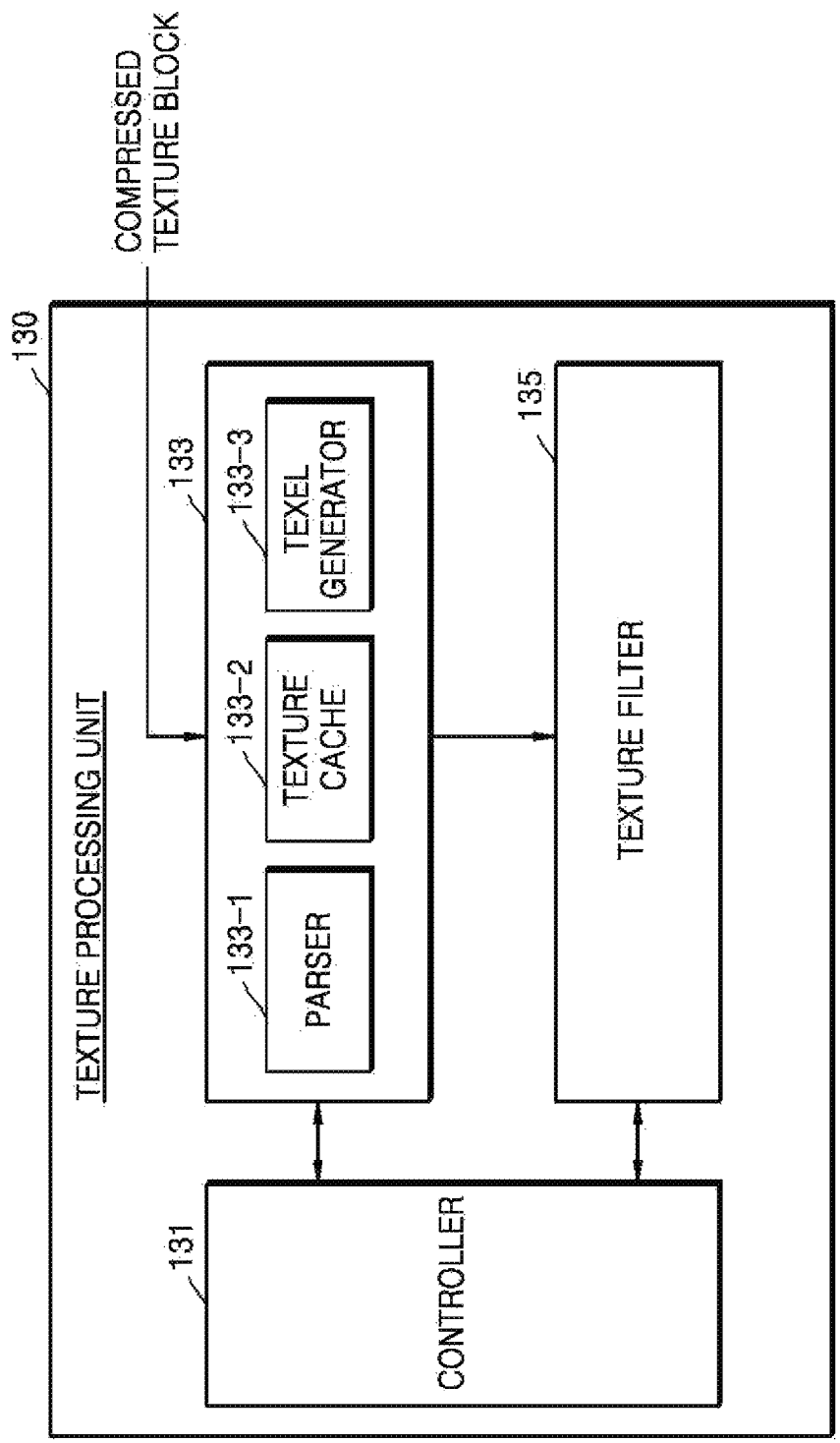
FIG. 6 is a diagram for describing operations of a texture processing unit, according to at least one example embodiment.

The texture filter 135 may perform texture filtering by using the texel values generated by the decompressor 133. Filtering of texel values denotes obtaining a color value corresponding to a pixel by blending the texel values. For example, the texture filter 135 may obtain the color value corresponding to the pixel by obtaining an average of texel values included in a partial region, or a full region, on a texture space including a texel address. The texel value filtered by the texture filter 135 may be transmitted to the shader core 120 in response to a request of the shader core 120. The texture filtering performed by the texture filter 135 may be any one of various filtering methods, such as a tri-linear filtering method, etc, FIG. 6 is a diagram for describing operations of the texture processing unit 130, according to at least one example embodiment. According to at least one example embodiment, the decompressor 133 of the texture processing unit 130 shown in FIG. 6, may be an independent texture decompressing module and/or apparatus.

Referring to FIG. 6, the texture processing unit 130 may include the controller 131, the decompressor 133, and the texture filter 135, etc., but is not limited thereto. The decompressor 133 may include a parser 133-1, a texture cache 133-2, and a texel generator 133-3, etc., but is not limited thereto. The texture cache 133-2 may be included in the decompressor 133 as shown in FIG. 6, or may be provided outside the decompressor 133.

The parser 133-1 may obtain, based on a compressed texture block, a representative value of texels forming a texture block, an index or weight of each of the texels forming the texture block, a bit supporting mode indicating a supporting relationship between texture blocks, and a supporting bit. In other words, when the compressed texture block is input to the decompressor 133, the parser 133-1 may obtain the representative value, the index or weight, and information about the bit supporting mode, based on the received compressed texture block, and when the bit supporting mode indicates a compressed texture block providing a supporting bit to an adjacent texture block, a supporting bit may be further obtained from a compression data bit of the compressed texture block.

Figure 7:
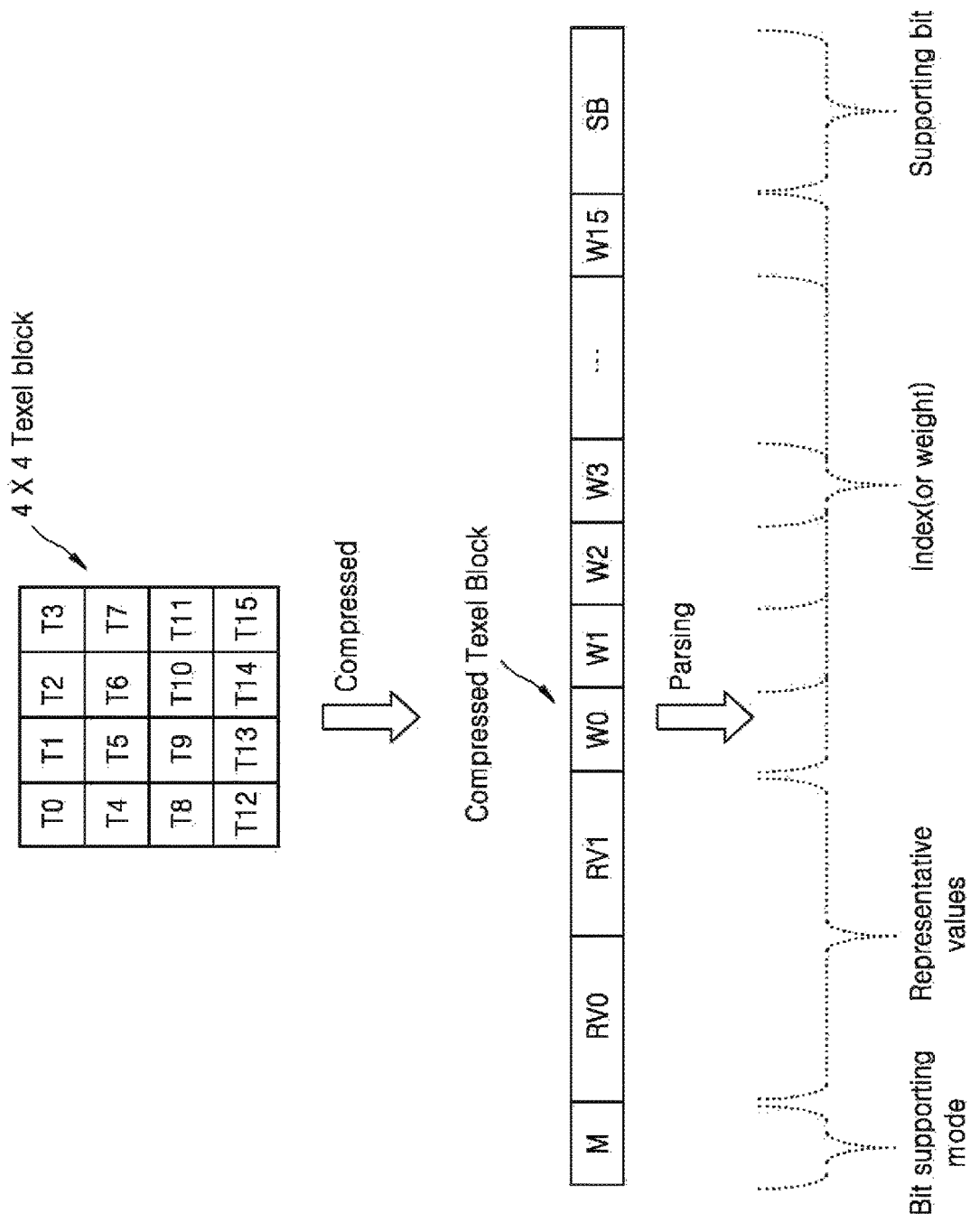
FIG. 7 is a diagram for describing operations of a parser of a decompressor according to at least one example embodiment.

FIG. 7 is a diagram for describing operations of the parser 133-1 of the decompressor 133 according to at least one example embodiment.

The parser 133-1 may obtain information about a bit supporting mode indicating a supporting relationship between texture blocks from compression data bit of a compressed texture block. The parser 133-1 may obtain a representative value of texels forming a texture block and an index or weight of each of the texels forming the texture block from the compression data bit of the compressed texture block. For example, the index or weight of each of the texels may be the same as the number of texels forming the texture block. The parser 133-1 may further obtain a supporting bit when the bit supporting mode indicates a compressed texture block providing a supporting bit to an adjacent texture block. The supporting bit may include a color value usable in the adjacent texture block and an index or weight. The parser 133-1 may obtain, from the compressed texture block received from the decompressor 133, the bit supporting mode, the representative value, the index or weight, and/or information stored in the supporting bit, by determining a format of the compression data bit.

For convenience of description, in FIG. 7, the compressed texture block is obtained by compressing a texture block having a 4×4 size, but the example embodiments are not limited thereto. The texture block having a 4×4 size may include 16 texels total, from texel T0 through texel T15.

The compression data bit of the compressed texture block of FIG. 7 includes a bit supporting mode M indicating a supporting relationship between texture blocks, two representative values RV0 and RV1, weights W0 through W15 with respect to 16 texels, and a supporting bit SB. When the decompressor 133 receives such a compressed texture block, the bit supporting mode, the representative value, the index or weight, and the supporting bit are obtained based on the received compressed texture block, and may be stored in the texture cache 133-2 and/or a local memory.

For example, as shown in FIG. 7, the parser 133-1 may parse the bit supporting mode M, the representative values RV0 and RV1, the weights W0 through W15, and/or the supporting bit SB included in the compressed texture block. The parser 133-1 may parse and process the representative values RV0 and RV1 as representative values of the texels forming the texture block. The parser 133-1 may parse and process the weights W0 through W15 as weights of the texels forming the texture block. The parser 133-1 may determine whether to further parse the supporting bit SB according to a value of the bit supporting mode M parsed from the compression data bit.

Referring back to FIG. 6, the texture cache 133-2 may store the bit supporting mode, the representative value, the index or weight, and/or the supporting bit, which have been obtained by the parser 133-1. In other words, the texture cache 133-2 may store the representative values of the texels corresponding to the whole compressed texture block, the index or weight of each of the texels forming the texture block, and/or the supporting bit according to the bit supporting mode indicating the supporting relationship between the adjacent texture blocks. A value parsed from a first compressed texture block may be stored in the texture cache 133-2 and then used to decompress a second compressed texture block adjacent to the first compressed texture block, The texel generator 133-3 may generate the texels included in the texture block based on the representative value, the index or weight, and/or the information stored in the supporting bit. For example, the texel generator 133-3 may reconstruct texels of the compressed texture block by using the representative value, the index or weight, and/or the information stored in the supporting bit, which are stored in the texture cache 133-2.

However, as described above, despite each of the texture blocks that form a texture possibly having a different numbers of color values, all of the texture blocks of the texture are compressed using the same number of bits (e.g., the same bit number). As a result, the some texture blocks are unable to (perfectly) realize all of the colors included in the original texture blocks due to an insufficient number of compression bits for accurately compressing the information about all of the colors included in the original texture blocks. For example, a texture block having a 4×4 size may have 16 colors maximum, and as shown in FIG. 7, when only two representative values are to be selected according to a determined compressing method regardless of the actual number of colors included in the texture block, the texture block including the number of various colors may be different from an original texture block during decompression. Meanwhile, a texture block having a 4×4 size may have 1 color minimum, and in this case, a compression parameter capable of indicating one color value is sufficient, or in other words, if the number of colors that are actually included in the texture block is less than the maximum number of colors possible for the number of compression bits (e.g., only 1 color value is present in the 4×4 block, but there is a 16 color maximum, then the compression parameter is sufficient). However, since the texture block is compressed by the compression data bit number is equal to the compression data bit number used for other texture blocks, the texture block may have compressed information about colors not used during the compression of the original texture block.

Hereinafter, texture compressing and decompressing methods, which compress some color information of a texture block, which is unable to realize all colors included in the texture block using a determined compression bit number, to be stored in a supporting bit of a compression data bit of a texture block, which is able to realize all of the colors included in the texture block by a bit number lower than the determined compression bit number based on a color distribution of each texture block, will be described.

FIG. 8 is a diagram for describing an example of a bit supporting mode indicating a supporting relationship between texture blocks according to at least one example embodiment. Referring to FIG. 8, the bit supporting mode is expressed by 2 bits and may be a total of 4 types/values, i.e., '00', '01', '10', and '11', For example, when a bit supporting mode of a first texture block is a first value, e.g., '00', and a bit supporting mode of an adjacent texture block of the first texture block is not the first value, e.g., '00', information about a color stored in a supporting bit of the adjacent texture block may be used as a representative value or weight used to decompress the first texture block. In other words, when the bit supporting mode of the first texture block is '00', the first texture block may receive, from the adjacent texture block of which the bit supporting mode is not '00', the representative value and an index or weight used to decompress the first texture block, When the bit supporting mode of the first texture block is a second value, e.g., '01', the first texture block may provide a representative value and an index or weight used to decompress a texture block to an adjacent texture block in a first direction, e.g., to the right of the first texture block.

When the bit supporting mode of the first texture block is a third value, e.g., '10', the first texture block may provide a representative value and an index or weight used to decompress a texture block to a second direction of the first texture block, e.g., to the left of the first texture block.

When the bit supporting mode of the first texture block is a fourth value, e.g., '11', the first texture block may provide a representative value and an index or weight used to decompress adjacent blocks in both directions, e.g., the left and right texture blocks, to the left and right of the first texture block.

As a result, according to at least one example embodiment, when the bit supporting mode of the first texture block is '00', the first texture block may be an acceptor texture block as long as the bit supporting mode of the adjacent texture block is not '00'. When the bit supporting mode of the first texture block is '01', '10', or '11', the first texture block may be a donor texture block, FIGS. 9 through 11 are diagrams for describing examples of providing a supporting bit to an adjacent texture block according to a bit supporting mode, with respect to adjacent texture blocks, according to some example embodiments.

Compressing and decompressing methods performed on arbitrary adjacent texture blocks forming a texture by using a bit supporting mode of 2 bits and a supporting bit described above with reference to FIG. 8 will now be described, Referring to texture blocks A through C of FIG. 9, the texture block A has one color, the texture block B has 6 colors, and the texture block C has 2 colors. Various colors may be distributed in the texture block B compared to adjacent texture blocks, and a color that is the same as that of the texture block A is included in the texture block B. Since the texture block B is unable to compress information about all of the colors distributed in the texture block B based on the given compression data bits (e.g., 2 bits which would support 4 colors), and the texture block A is able to provide a supporting bit because texture block A only requires a single bit to represent the 1 color included in the texture block, the texture block B may receive the supporting bit (e.g., an additional bit used for the color information) from the texture block A.

Figure 9:
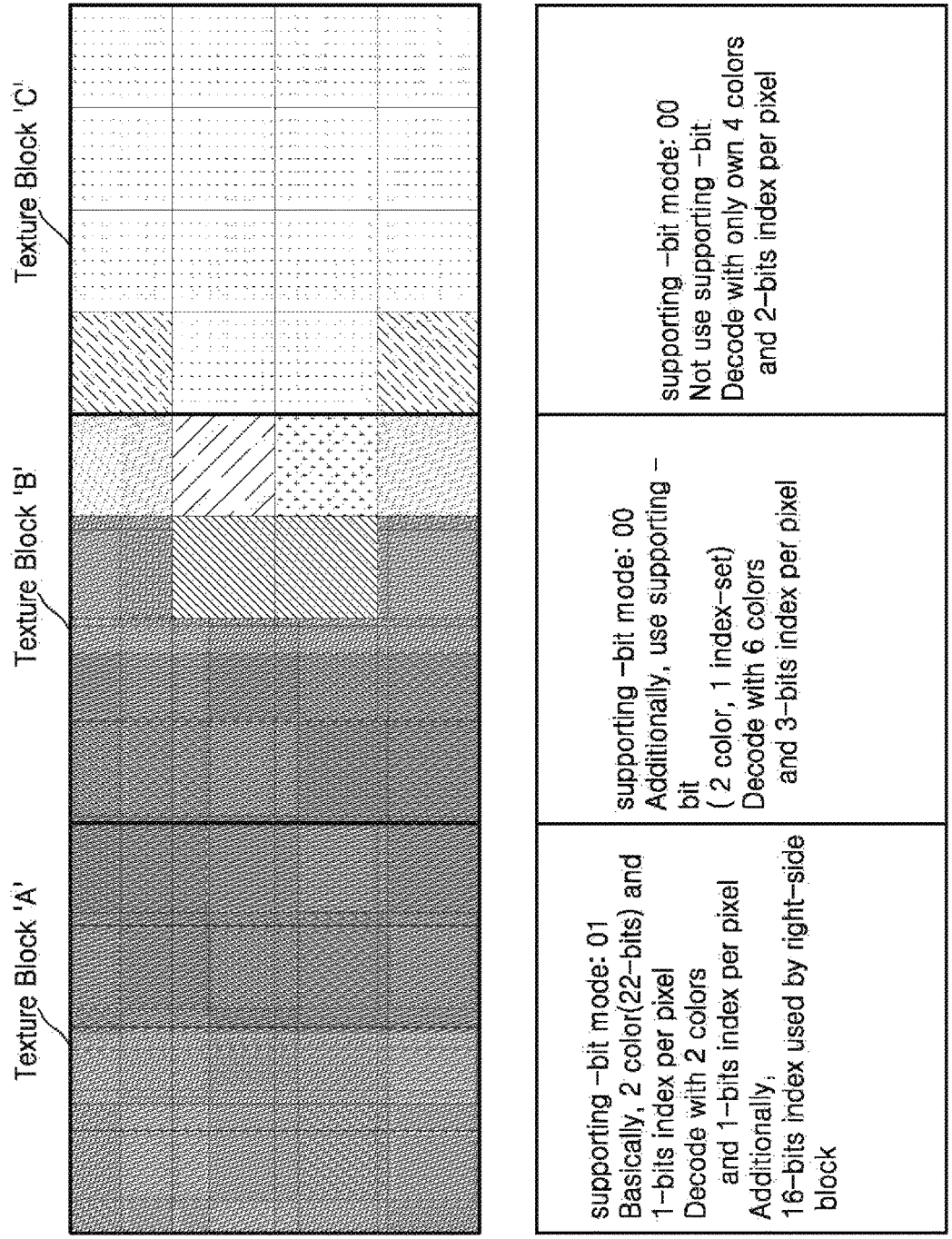
FIGS. 9 through 11 are diagrams for describing examples of providing a supporting bit to an adjacent texture block according to a bit supporting mode, with respect to adjacent texture blocks according to at least one example embodiment.

Referring to FIG. 9, a bit supporting mode is set to each of the texture blocks A through C. The bit supporting mode of the texture block A is '01', and the bit supporting modes of the texture blocks B and C are '00', The texture block A may provide a supporting bit such that a texture block to the right of the texture block A may use the supporting bit. Information about a color that was not able to be included in a compression data bit of the texture block B may be compressed to be stored in the supporting bit of the texture block A. Also, the texture block B may be decompressed by using color information included in a compression data bit of the texture block B together with color information stored in the supporting bit of the texture block A. The color information stored in the supporting bit of the texture block A may be stored in the texture cache 133-2 of the decompressor 133 and/or a local memory. When the color information stored in the supporting bit is not stored in the texture cache 133-2 of the decompressor 133 or the local memory, the texture block B may be decompressed by only using the compression data bit of the texture block B or by receiving the color information stored in the supporting bit of the texture block A from the memory 200, according to this example, however the example embodiments are not limited thereto, In FIG. 9, while decompressing the texture block B, an index of 2 bits is additionally assigned to each of the texels of two columns adjacent to the texture block A, from among texels of the texture block B, i.e., to each of the 8 texels in the left region of the texture block B. One of the two bits of the index determines whether to use the color information stored in the supporting bit of the texture block A, and the other of the two bits of the index selects one of the two colors derived from a representative value of the texture block A. Meanwhile, since the bit supporting mode of the texture block B adjacent to the texture block C is '00', the texture block C is unable to receive the color information of the texture block B from the texture block B, even if the texture blocks B and C have the same colors.

Figure 10:
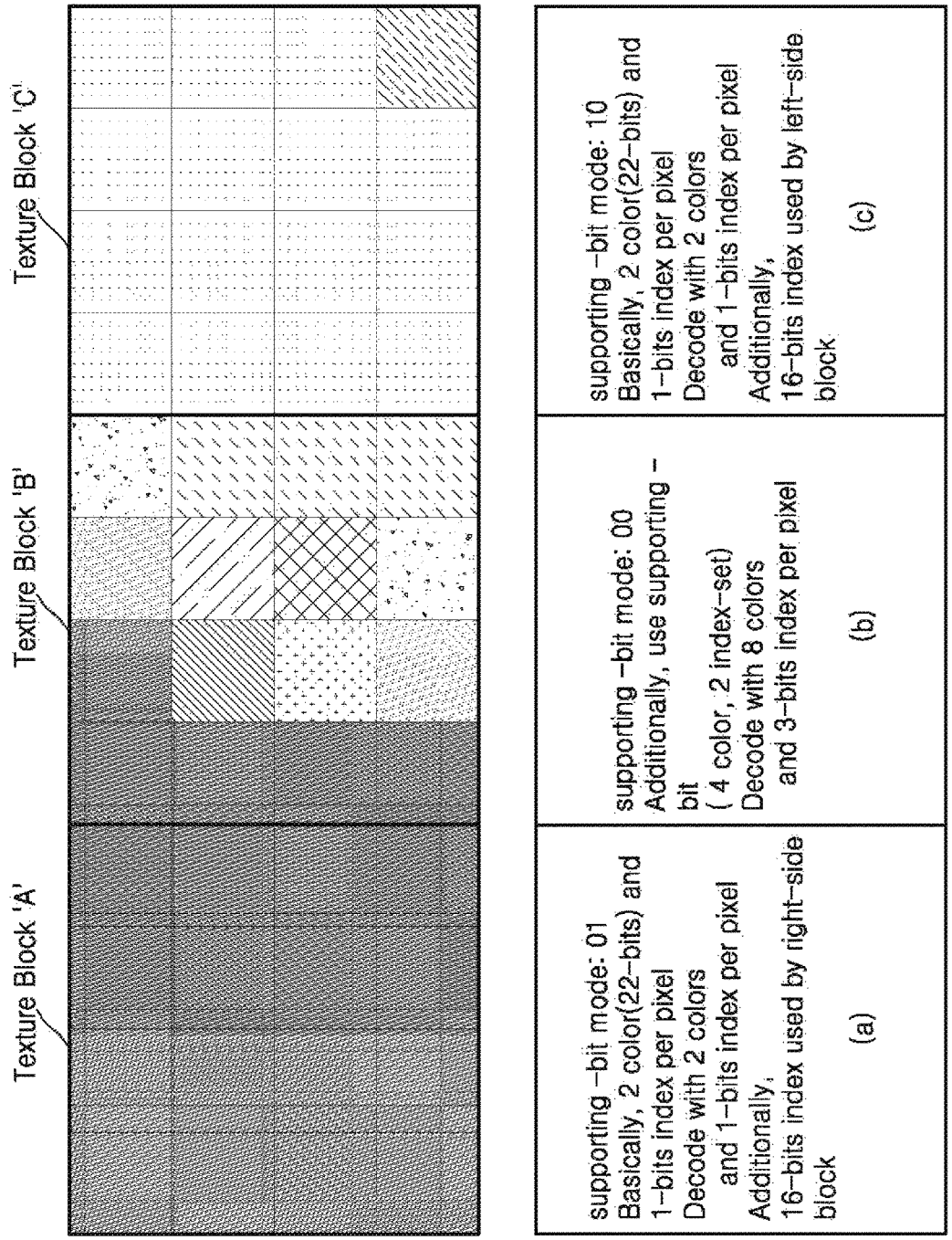
Figure 11:
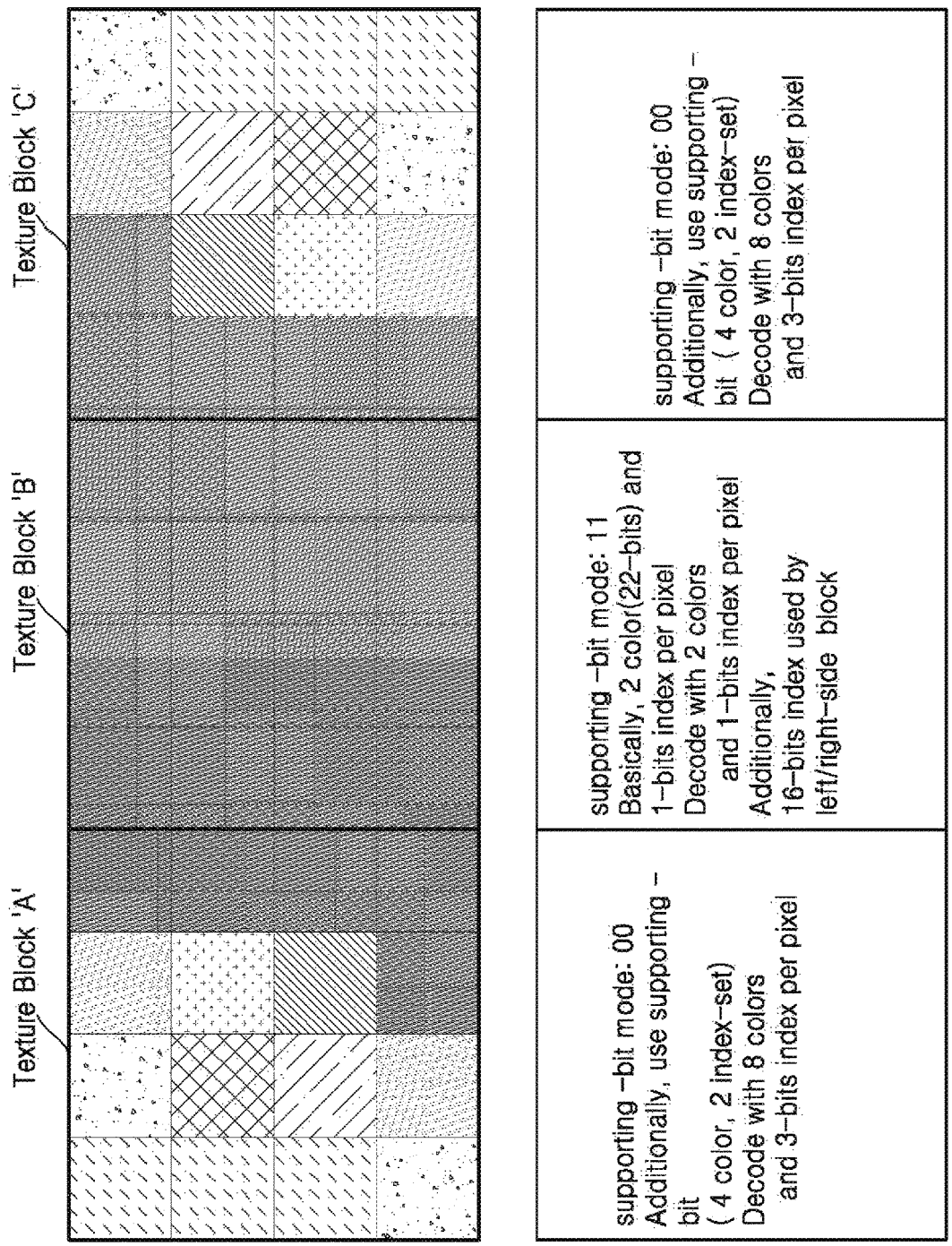

Referring to texture blocks A through C shown in FIG. 10, the texture block A has one color, the texture block B has 8 colors, and the texture block C has 2 colors. Various colors are distributed in the texture block B when compared to the adjacent texture blocks, and the texture block B includes a same color as that of the texture blocks A and C. Since information about all colors distributed in the texture block B is unable to be compressed using the given number of compression data bits and the texture blocks A and C are able to provide a supporting bit, the texture block B may receive the supporting bit from the texture blocks A and C.

Referring to FIG. 10, a bit supporting mode is set for each of the texture blocks A through C. The bit supporting mode of the texture block A is '01', the bit supporting mode of the texture block B is '00', and the bit supporting mode of the texture block C is '10'. The texture block A may provide a supporting bit such that a texture block to the right of the texture block A (e.g., the right texture block) may use the supporting bit, and the texture block C may provide a supporting bit such that a texture block to the left of the texture block C (e.g., the left texture block) may use the supporting bit. While the texture block B is being compressed, information about a color that was not able to be included in a compression data bit of the texture block B may be compressed to be stored in the supporting bits of the texture blocks A and C. Also, the texture block B may be decompressed by using color information included in a compression data bit of the texture block B together with color information stored in the supporting bits of the texture blocks A and C. The color information stored in the supporting bit of the texture block A and the color information stored in the supporting bit of the texture block C may be stored in the texture cache 133-2 of the decompressor 133 and/or a local memory. When the color information stored in the supporting bit is not stored in the texture cache 133-2 of the decompressor 133 and/or the local memory, the texture block B may be decompressed by only using the compression data bit of the texture block B or by receiving the color information stored in the supporting bits of the texture blocks A and C from the memory 200.

In FIG. 10, while decompressing the texture block B, an index of 2 bits is additionally assigned to each of the texels of two columns adjacent to the texture block A, from among texels of the texture block B, i.e., to each of the 8 texels at a left region of the texture block B. Also, an index of 2 bits is additionally assigned to each of the texels of two columns adjacent to the texture block C, from among texels of the texture block B, i.e., to each of the 8 texels at a left region of the texture block B. One of the two bits of the index determines whether to use the color information stored in the supporting bit of the texture block A or C, and the other of the two bits of the index selects one of the two colors derived from a representative value of the texture block A or C.

Referring to texture blocks A through C shown in FIG. 11, the texture block A has 8 colors, the texture block B has 1 color, and the texture block C has 8 colors. Various colors are distributed in the texture blocks A and C when compared to the adjacent texture block B, and the texture block B has a same color as that of the texture blocks A and C. Since information about all of the colors distributed in the texture blocks A and C is unable to be compressed by given compression data bits and the texture block B is able to provide a supporting bit, the texture block B may provide the supporting bit to the texture blocks A and C.

Referring to FIG. 11 a bit supporting mode is set for each of the texture blocks A through C. The bit supporting mode of the texture block A is '00', the bit supporting mode of the texture block B is '11', and the bit supporting mode of the texture block C is '00'. The texture block B may provide a supporting bit to the texture blocks A and C such that the texture blocks A and C may use the supporting bit. While the texture blocks A and C are each being compressed, color information that was not able to be included in a compression data bit of the texture block A and color information that was not able to be included in a compression data bit of the texture block C may be compressed to be stored in the supporting bit of the texture block B. Also, the texture blocks A and C may be decompressed by using color information included in the compression data bits of the texture blocks A and C together with color information stored in the supporting bit of the texture block B. The color information stored in the supporting bit of the texture block A and the color information stored in the supporting bit of the texture block C may be stored in the texture cache 133-2 of the decompressor 133 and/or a local memory. When the color information stored in the supporting bit is not stored in the texture cache 133-2 of the decompressor 133 or the local memory, the texture blocks A and C may be decompressed by only respectively using the compression data bits of the texture blocks A and C or by receiving the color information stored in the supporting bit of the texture block B from the memory 200.

In FIG. 11, while decompressing the texture blocks A and C, an index of 2 bits is additionally assigned to each of the texels of one column adjacent to the texture block B, from among texels of the texture block A, i.e., to each of the 4 texels at a rightmost column of the texture block A. Also, an index of 2 bits is additionally assigned to each of the texels of one column adjacent to the texture block B, from among texels of the texture block C, i.e., to each of the 4 texels at a leftmost column of the texture block C. One of the two bits of the index determines whether to use the color information stored in the supporting bit of the texture block B, and the other of the two bits of the index selects one of the two colors derived from a representative value of the texture block B.

FIG. 12 is a diagram for describing another example of a bit supporting mode indicating a supporting relationship between texture blocks according to at least one example embodiment.

Referring to FIG. 12, the bit supporting mode is expressed by 3 bits, and is 8 types/values total, i.e., '000', '001', '010', '011', '100', '101', '110', and '111'.

For example, when a bit supporting mode of a first texture block is a first value, e.g., '000', and a support bit mode of an adjacent texture block is not the first value '000', color information stored in a supporting bit of the adjacent texture block may be used as color information used to decompress the first texture block. In other words, when the bit supporting mode of the first texture block is '000', the first texture block may receive color information used to decompress the first texture block, from the adjacent texture block of which the bit supporting mode is not '000'.

When the bit supporting mode of the first texture block is a second value, e.g., '001', the first texture block may provide color information used for decompression to a right texture block of the first texture block.

When the bit supporting mode of the first texture block is a third value, e.g., '010', the first texture block may provide color information used for decompression to a left texture block of the first texture block.

When the bit supporting mode of the first texture block is a fourth value, e.g., '011', the first texture block may provide color information used for decompression to left and right texture blocks of the first texture block, When the bit supporting mode of the first texture block is a fifth value, e.g., '100', the first texture block may provide color information used for decompression to upper, lower, left, and right texture blocks of the first texture block.

When the bit supporting mode of the first texture block is a sixth value, e.g., '101', the first texture block may provide color information used for decompression to an upper texture block of the first texture block.

When the bit supporting mode of the first texture block is a seventh value, e.g., '110', the first texture block may provide color information used for decompression to a lower texture block of the first texture block When the bit supporting mode of the first texture block is an eighth value, e.g., '111', the first texture block may provide color information used for decompression to upper and lower texture blocks of the first texture block.

As a result, when the bit supporting mode of the first texture block is '000', the first texture block may be an acceptor texture block as long as the bit supporting mode of the adjacent texture block is not '000'. When the bit supporting mode of the first texture block is '001', '010"011', '100', '101', '110', or '111', the first texture block may be a donor texture block.

Referring back to FIG. 6, when color information required for decompression of a compressed texture block is not stored in the texture cache 133-2, the controller 131 may request the memory 200 outside the texture processing unit 130 for a compressed texture block stored in the memory 200. Accordingly, the decompressor 133 may receive the compressed texture block from the memory 200 outside the texture processing unit 130.

The texture filter 135 may perform texture filtering by using texels generated by the texel generator 133-3. The texture filter 135 may perform the texture filtering when the number of texels generated by the texel generator 133-3 is a minimum number required to perform the texture filtering.

Figure 13:
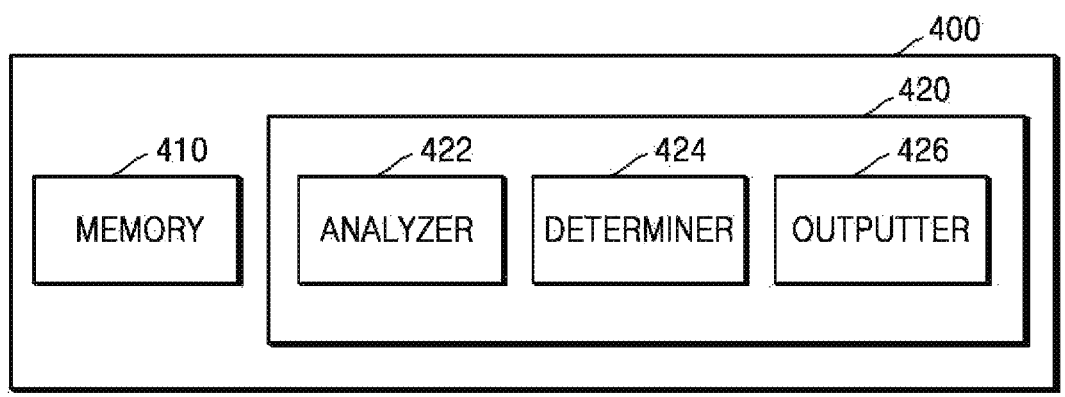
FIG. 13 is a block diagram of a structure of a texture compressing apparatus according to at least one example embodiment.

FIG. 13 is a block diagram of a structure of a texture compressing apparatus 400 according to at least one example embodiment. The texture compressing apparatus 400 may be realized as an independent module as shown in FIG. 13, or may be provided in a user terminal or external server including the graphics processing apparatus 100.

Referring to FIG. 13, the texture compressing apparatus 400 may include a memory 410 and at least one processor 420, but is not limited thereto.

The memory 410 may store at least one computer-executable instruction.

The at least one processor 420 may execute computer-executable instructions to analyze a supporting relationship between adjacent texture blocks, based on a color distribution of texture blocks forming a texture. The at least one processor 420 may analyze the supporting relationship between the adjacent texture blocks based on the number of colors common between the adjacent texture blocks and the number of colors of each of the adjacent texture blocks. The at least one processor 420 may determine a bit supporting mode indicating the supporting relationship and information about a color assigned to each of the texture blocks, and output a compressed texture block in which the determined bit supporting mode and the determined information are compression parameters.

The bit supporting mode may indicate a texture block providing a supporting bit or another texture block receiving the supporting bit, wherein the supporting bit stores information about a color not assigned to an adjacent texture block from among colors included in the adjacent texture block. When the bit supporting mode indicates the texture block providing the supporting bit, the processor 420 may further determine the supporting bit, and output the compressed texture block in which the determined supporting bit is further a compression parameter. The information about the color assigned to each of the texture blocks may include a representative value of the texels forming each of the texture blocks, and an index or weight used to obtain a color value corresponding to each texel, The at least one processor 420 may be in a form of a plurality of processors or an integrated processor according to functions. For example, as shown in FIG. 13, the processor 420 may include an analyzer 422 configured to analyze the supporting relationship between the adjacent texture blocks based on the color distribution of the texture blocks forming the texture, a determiner 424 configured to determine the bit supporting mode indicating the supporting relationship and the information about the color assigned to each texture block, and an outputter 426 configured to output the compressed texture block in which the bit supporting mode and the information, which are determined by the determiner 424, are the compression parameters.

Figure 14:
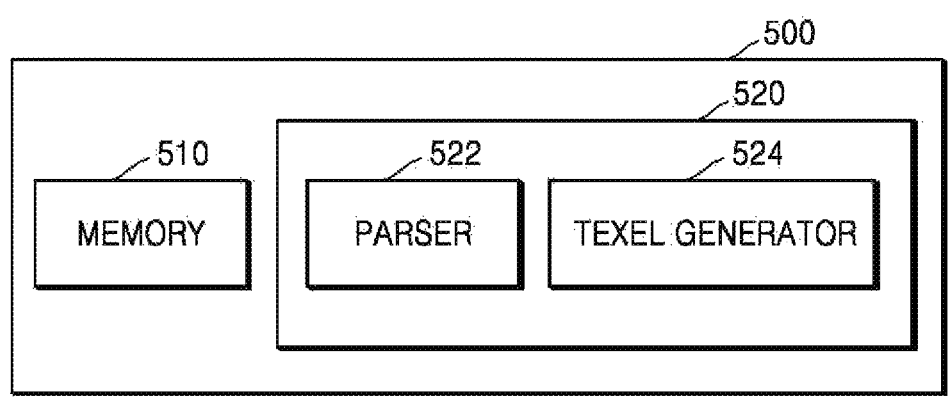
FIG. 14 is a block diagram of a structure of a texture decompressing apparatus according to at least one example embodiment.

FIG. 14 is a block diagram of a structure of a texture decompressing apparatus 500 according to at least one example embodiment. The texture decompressing apparatus 500 may be realized like the decompressor 133 in the texture processing unit 130, as shown in FIG. 6, or may be realized as an independent module, as shown in FIG. 14.

Referring to FIG. 14, the texture decompressing apparatus 500 may include a memory 510 and at least one processor 520, but is not limited thereto.

The memory 510 may store at least one computer-executable instruction.

By executing the computer-executable instructions, the at least one processor 520 may obtain, from a compressed texture block, a bit supporting mode indicating a supporting relationship between adjacent texture blocks, and information about a color assigned to a texture block, wherein the bit supporting mode and the information are compression parameters. The at least one processor 520 may determine whether to use information about a color assigned to an adjacent texture block based on the bit supporting mode, and generate texels forming the texture block based on the information about the color assigned to each texture block based on a result of the determining.

The bit supporting mode may indicate a texture block receiving a supporting bit or another texture block providing a supporting bit, wherein the supporting bit stores information about a color not assigned to an adjacent texture block from among colors included in the adjacent texture block. When the bit supporting mode indicates a texture block receiving a supporting bit, the at least one processor 520 may determine that information about a color assigned to the adjacent texture block is used, and generate texels forming the texture block based on information about a color assigned to the texture block and information about a color not assigned to the texture block from among colors included in the other texture block, which is stored in the supporting bit. The at least one processor 520 may use the information about the color not assigned to the texture block from among colors included in the adjacent texture block, which is stored in the supporting bit, only with respect to some of the texels forming the texture block. The information about the color assigned to each texture block may include a representative value of the texels forming each texture block, and an index or weight used to obtain a color value corresponding to each texel.

The at least one processor 520 may be in a form of a plurality of processors or an integrated processor according to functions. For example, as shown in FIG. 14, the at least one processor 520 may include a parser 522 configured to obtain, from a compressed texture block, a bit supporting mode indicating a supporting relationship between adjacent texture blocks, and information about a color assigned to each texture block, wherein the bit supporting mode and the information are compression parameters, and a texel generator 524 configured to determine whether to use information about a color assigned to an adjacent texture block based on the bit supporting mode, and generate texels forming the texture block based on the information about the color assigned to each texture block based on a result of the determining.

Figure 15:
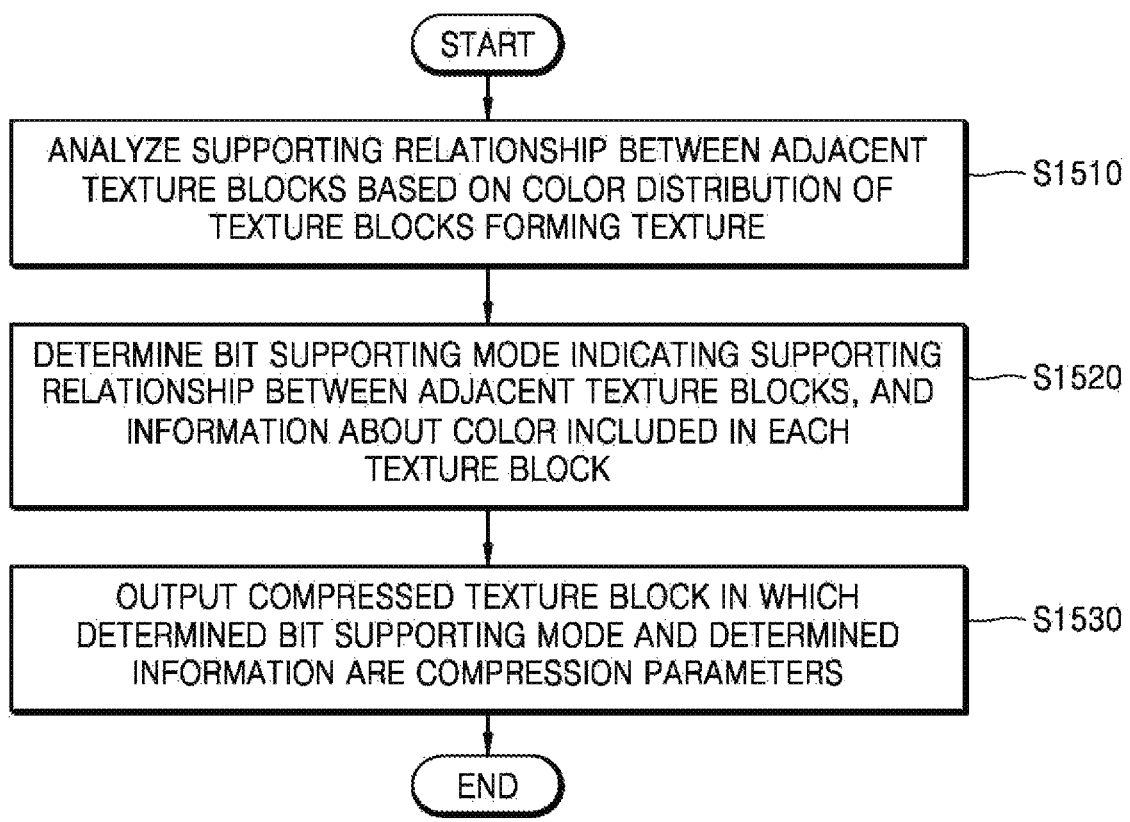
FIG. 15 is a flowchart of a texture compressing method according to at least one example embodiment.

FIG. 15 is a flowchart of a texture compressing method according to at least one example embodiment.

In operation S1510, the texture compressing apparatus 400 may analyze a supporting relationship between adjacent texture blocks based on a color distribution of texture blocks forming a texture. The texture compressing apparatus 400 may analyze the supporting relationship between the adjacent texture blocks based on the number of colors common between the adjacent texture blocks and the number of colors of each of the adjacent texture blocks.

In operation S1520, the texture compressing apparatus 400 may determine a bit supporting mode indicating the supporting relationship between the adjacent texture blocks, and information about a color assigned to each of the texture blocks. The bit supporting mode may indicate a texture block providing a supporting bit or another texture block receiving the supporting bit, wherein the supporting bit stores information about a color not assigned to an adjacent texture block from among colors included in the adjacent texture block. When the bit supporting mode indicates the texture block providing the supporting bit, the texture compressing apparatus 400 may further determine the supporting bit. The information about the color assigned to each texture block may include a representative value of the texels forming each texture block, and an index or weight used to obtain a color value corresponding to each texel.

In operation S1530, the texture compressing apparatus 400 may output a compressed texture block in which the determined bit supporting mode and the determined information are compression parameters. When the bit supporting mode indicates a texture block providing a supporting bit, the texture compressing apparatus 400 may output the compressed texture block in which the supporting bit is further a compression parameter.

Figure 16:
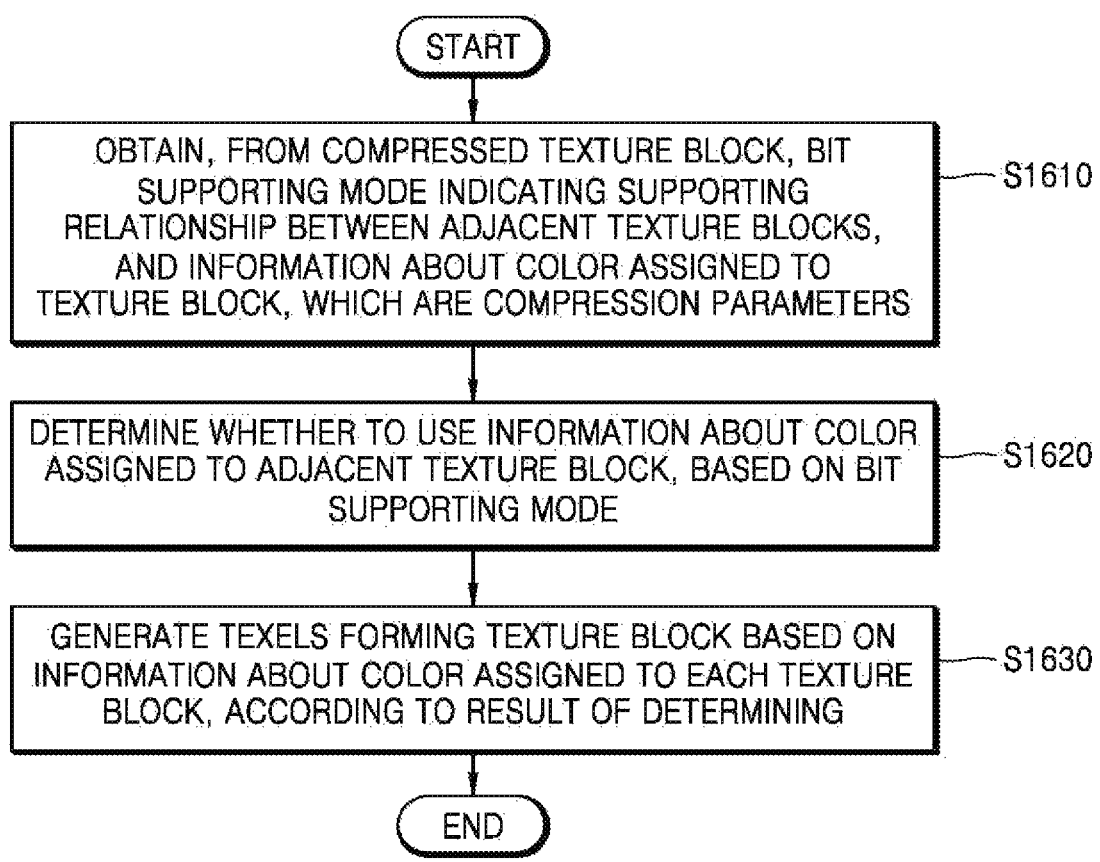
FIG. 16 is a flowchart of a texture decompressing method according to at least one example embodiment.

FIG. 16 is a flowchart of a texture decompressing method according to at least one example embodiment.

In operation S1610, the texture decompressing apparatus 500 may obtain, from a compressed texture block, a bit supporting mode indicating a supporting relationship between adjacent texture blocks, and information about a color assigned to each texture block, wherein the bit supporting mode and the information are compression parameters. The bit supporting mode may indicate a texture block receiving a supporting bit or another texture block providing the supporting bit, wherein the supporting bit stores information about a color not assigned to an adjacent texture block from among colors included in the adjacent texture block.

In operation S1620, the texture decompressing apparatus 500 may determine whether to use information about a color assigned to the adjacent texture blocks based on the bit supporting mode. When the bit supporting mode indicates a texture block receiving a supporting bit, the texture decompressing apparatus 500 may determine that the information about the color assigned to the adjacent texture block is used.

In operation S1630, the texture decompressing apparatus 500 may generate texels forming the texture block based on the information about the color assigned to each texture block, according to a result of the determining. When the bit supporting mode indicates the texture block receiving the supporting bit, the texture decompressing apparatus 500 may generate the texels forming the texture block based on the information about the color assigned to texture block and the information about the color not assigned to the texture block from among the colors included in the adjacent texture block, which is stored in the supporting bit. The information about the color assigned to each texture block may include a representative value of the texels forming each texture block and an index or weight used to obtain a color value corresponding to each texel. Meanwhile, the texture decompressing apparatus 500 may use the information about the color not assigned to the texture block from among colors included in the adjacent texture block, which is stored in the supporting bit, only with respect to some of the texels forming the texture block.

The texture compressing and/or decompressing method described above can be written as computer programs that include computer readable instructions or computer executable instructions and can be implemented in digital computers that execute the programs using a non-transitory computer-readable recording medium. Examples of the non-transitory computer-readable recording medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMS, BD-ROMs, BD-Rs, BD-R LTHs, BD-REs, magnetic tape, a floppy disk, a magneto-optical data storage device, an optical data storage device, a hard disk, a solid-state disk (SSD), and any device capable of storing commands or software, related data, a data file, and data structures and providing the commands or software, the related data, the data file, and the data structures to a processor or a computer such that the processor or the computer may execute the commands.

It should be understood that embodiments described herein should be considered in a descriptive sense only and not for purposes of limitation. Descriptions of features or aspects within each example embodiment should typically be considered as available for other similar features or aspects in other example embodiments.

While one or more example embodiments have been described with reference to the figures, it will be understood by those of ordinary skill in the art that various changes in form and details may be made therein without departing from the spirit and scope as defined by the following claims.

As is traditional in the field of the inventive concepts, various example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar processing devices, they may be programmed using software (e.g., microcode) to perform various functions discussed herein and may optionally be driven by firmware and/or software, thereby transforming the microprocessor or similar processing devices into a special purpose processor. Additionally, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the embodiments may be physically separated into two or more interacting and discrete blocks, units and/or modules without departing from the scope of the inventive concepts. Further, the blocks, units and/or modules of the embodiments may be physically combined into more complex blocks, units and/or modules without departing from the scope of the inventive concepts.

What is claimed is:

1. A texture compressing method comprising:
   analyzing, using at least one processor, a supporting relationship between a plurality of adjacent texture blocks of a plurality of texture blocks based on a total number of colors distributed in each of the plurality of texture blocks, each of the plurality of texture blocks including a plurality of texels, and the plurality of texture blocks forming a texture;
   determining, using the at least one processor, a bit supporting mode indicating the supporting relationship between at least a first adjacent texture block and a second adjacent texture block of the plurality of adjacent texture blocks based on the total number of colors included in each of the plurality of adjacent texture blocks, and color information corresponding to at least one representative color assigned to each of the plurality of texture blocks;
   compressing, using the at least one processor, the first adjacent texture block based on the determined bit supporting mode and the determined color information as first and second compression parameters; and
   outputting, using the at least one processor, the compressed first adjacent texture block to a memory, the compressed first adjacent texture block including the at least one representative color assigned to the first adjacent texture block, an index assigned to each of the texels included in the first adjacent texture block, and supporting information corresponding to the determined bit supporting mode, the supporting information storing information corresponding to a color not assigned to the second adjacent texture block from among the at least one representative color assigned to the second adjacent texture block, the stored supporting information used to decompress a second compressed texture block corresponding to the second adjacent texture block.

2. The texture compressing method of claim 1, wherein the bit supporting mode indicates the first adjacent texture block as providing the supporting information to the second adjacent texture block, or the first adjacent texture block as receiving supporting information from the second adjacent texture block.

3. The texture compressing method of claim 2, wherein, in response to the bit supporting mode indicating the first adjacent texture block provides the supporting information:
   the determining further comprises determining the supporting information for the second adjacent texture block, the determined supporting information including color information corresponding to an additional representative value of the second adjacent texture block not included in the second compressed texture block and an index used to decompress the second compressed texture block; and
   the compressing further comprises compressing the first adjacent texture block such that the determined supporting information is used as a third compression parameter.

4. The texture compressing method of claim 1, wherein the analyzing further comprises analyzing the supporting relationship between the plurality of adjacent texture blocks based on a number of common colors between the plurality of adjacent texture blocks and the total number of colors included in each of the plurality of texture blocks.

5. A non-transitory computer-readable recording medium having recorded there on computer readable instructions which, when executed by at least one processor, performs the texture compressing method of claim 1.

6. A texture compressing apparatus comprising:
a memory configured to store computer-executable instructions; and
at least one processor configured to execute the computer-executable instruction to,
analyze a supporting relationship between a plurality of adjacent texture blocks of a plurality of texture blocks based on a total number of colors distributed in each of the plurality of texture blocks, each of the plurality of texture blocks including a plurality of texels, and the plurality of texture blocks forming a texture,
determine a bit supporting mode indicating the supporting relationship between at least a first adjacent texture block and a second adjacent texture block of the plurality of adjacent texture blocks based on the total number of colors included in each of the plurality of adjacent texture blocks, and color information corresponding to at least one representative color assigned to each of the plurality of texture blocks,
compress the first adjacent texture block based on the determined bit supporting mode and the determined color information as first and second compression parameters, and
output the compressed first texture block to a frame memory, the compressed first adjacent texture block including the at least one representative color assigned to the first adjacent texture block, an index assigned to each of the texels included in the first adjacent texture block, and a supporting information corresponding to the determined bit supporting mode, the supporting information storing information corresponding to a color not assigned to the second adjacent texture block from among the at least one representative color assigned to the second adjacent texture block, the stored supporting information used to decompress a second compressed texture block corresponding to the second adjacent texture block.

7. The texture compressing apparatus of claim 6, wherein the bit supporting mode indicates the first adjacent texture block as providing the supporting information to the second adjacent texture block, or the first adjacent texture block as receiving supporting information from the second adjacent texture block.

8. The texture compressing apparatus of claim 7, wherein the at least one processor is further configured to, in response to the bit supporting mode indicating the first adjacent texture block as providing the supporting information:
determine the supporting information for the second adjacent texture block, the determined supporting information including color information corresponding to an additional representative value of the second adjacent texture block not included in the second compressed texture block and an index used to decompress the second compressed texture block; and
compress the first adjacent texture block such that the determined supporting information is used as a third compression parameter.

9. The texture compressing apparatus of claim 6, wherein the at least one processor is further configured to analyze the supporting relationship between the plurality of adjacent texture blocks based on a number of common colors between the plurality of adjacent texture blocks and the total number of colors of each of the plurality of texture blocks.

10. The texture compressing apparatus of claim 6, wherein the information about the at least one representative color assigned to each of the plurality of texture blocks include a representative value of texels forming each of the plurality of texture blocks, and an index, or a weight, used to obtain a color value corresponding to each of the texels using the at least one representative color assigned to the texture block corresponding to the texel.

11. A texture decompressing method comprising:
receiving, using at least one processor, a compressed first texture block corresponding to a first texture block;
obtaining, using the at least one processor, a bit supporting mode indicating the supporting relationship between at least the first texture block and a second texture block of a plurality of adjacent texture blocks, and color information related to a representative color assigned to the first texture block, from the compressed first texture block, wherein the bit supporting mode and the color information are first and second compression parameters,
the compressed first texture block including a plurality of texels, an index assigned to each of the texels included in the first texture block, and the supporting information,
the supporting information storing information corresponding to a color not assigned to the first texture block from the representative color assigned to the second texture block;
determining, using the at least one processor, whether to use color information related to a representative color assigned to the second texture block to decompress the compressed first texture block based on the bit supporting mode of the compressed first texture block; and
generating, using the at least one processor, the texels forming the original first texture block based on the color information related to the color assigned to the second texture block according to a result of the determining.

12. The texture decompressing method of claim 11, wherein
the bit supporting mode indicates the first texture block as receiving a supporting information or a second texture block as providing the supporting information; and
the supporting information stores information related to a color not assigned to an adjacent texture block of the plurality of adjacent texture blocks from among colors included in the adjacent texture block.

13. The texture decompressing method of claim 12, wherein, when the bit supporting mode indicates the first texture block as receiving the supporting information:
the determining further comprises determining to use the color information related to the color assigned to the plurality of adjacent texture blocks; and
the generating further comprises generating the texels forming the first texture block based on the color information related to the color assigned to the first texture block and the color information related to the color not assigned to the adjacent texture block of the plurality of adjacent texture blocks from among the colors included in the adjacent texture block which is stored in the supporting information.

14. The texture decompressing method of claim 12, wherein the generating further comprises:
generating the texels forming the texture block based on the color information related to the color not assigned to the adjacent texture block from among the colors included in the adjacent texture block, which is stored in the supporting information, for some of the texels forming the texture block.

15. A non-transitory computer-readable recording medium having recorded there on computer readable instructions which, when executed by at least one processor, performs the texture decompressing method of claim 11.

16. A texture decompressing apparatus comprising:
a memory configured to store computer-executable instructions; and
at least one processor configured to execute the computer-executable instructions to,
receive a compressed first texture block corresponding to a first texture block,
obtain a bit supporting mode indicating a supporting relationship between at least the first texture block and a second texture block of a plurality of adjacent texture blocks, and color information related to a representative color assigned to the first texture block from the compressed first texture block, wherein the bit supporting mode and the color information are first and second compression parameters,
the compressed first texture block including a plurality of texels, an index assigned to each of the texels included in the first texture block, and supporting information,
the supporting information storing information corresponding to a color not assigned to the first texture block from the representative color assigned to the second texture block,
determine whether to use color information related to at least one representative color assigned to the second texture block to decompress the compressed first texture block based on the bit supporting mode, and
generate the texels forming the original first texture block based on the color information related to the color assigned to each the second texture block according to a result of the determining.

17. The texture decompressing apparatus of claim 16, wherein
the bit supporting mode indicates the first texture block as receiving a supporting information or the first texture block as providing the supporting information.

18. The texture decompressing apparatus of claim 17, wherein the at least one processor is further configured to, when the bit supporting mode indicates the first texture block as receiving the supporting information:
determine to use the color information related to the color assigned to the plurality of adjacent texture blocks; and
generate the texels forming the original first texture block based on the color information related to the color assigned to each texture block of the plurality of adjacent texture blocks and the color information related to the color not assigned to the first texture block from among the colors included in the first texture block, which is stored in the supporting information.

19. The texture decompressing apparatus of claim 17, wherein the at least one processor is further configured to:
generate the texels forming the original texture block based on the color information related to the color not assigned to the first texture block from among the colors included in the first texture block, which is stored in the supporting information, for some of the texels forming the original first texture block.

20. The texture decompressing apparatus of claim 16, wherein the color information related to the color assigned to each of the texture blocks are a representative value of texels forming each of the texture blocks, and an index, or a weight, used to obtain a color value corresponding to each of the texels.

* * * * *